(12) United States Patent
Kasano et al.

(10) Patent No.: US 10,260,694 B2
(45) Date of Patent: Apr. 16, 2019

(54) HEADLIGHT FOR VEHICLE AND VEHICLE USING THE SAME

(71) Applicant: Panasonic Intellectual Property Management Co., Ltd., Osaka (JP)

(72) Inventors: Masahiro Kasano, Osaka (JP); Takashi Matsuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/950,854

(22) Filed: Apr. 11, 2018

(65) Prior Publication Data

US 2018/0356060 A1   Dec. 13, 2018

(30) Foreign Application Priority Data

Jun. 9, 2017   (JP) ................................ 2017-113896

(51) Int. Cl.

| F21S 41/147 | (2018.01) |
|---|---|
| B60Q 1/04 | (2006.01) |
| F21S 41/275 | (2018.01) |
| F21S 41/65 | (2018.01) |
| F21Y 115/10 | (2016.01) |

(52) U.S. Cl.
CPC .......... *F21S 41/147* (2018.01); *B60Q 1/0483* (2013.01); *F21S 41/275* (2018.01); *F21S 41/65* (2018.01); *F21Y 2115/10* (2016.08)

(58) Field of Classification Search
None
See application file for complete search history.

(56) References Cited

U.S. PATENT DOCUMENTS

| 2004/0042212 A1 | 3/2004 | Du et al. |
|---|---|---|
| 2004/0105275 A1 | 6/2004 | Sazuka et al. |
| 2014/0112012 A1 | 4/2014 | Nakazato et al. |
| 2017/0122528 A1* | 5/2017 | Kadoriku ................ F21S 41/00 |

FOREIGN PATENT DOCUMENTS

| JP | 2004-095479 | 3/2004 |
|---|---|---|
| JP | 2005-537665 | 12/2005 |
| JP | 2012-243727 | 12/2012 |

* cited by examiner

*Primary Examiner* — Jany Richardson
(74) *Attorney, Agent, or Firm* — Wenderoth, Lind & Ponack, L.L.P.

(57) ABSTRACT

A headlight for a vehicle having good heat dissipation performance includes a plurality of lens units, each including a plurality of light emitting devices, and lenses arranged so as to face the respective plural light emitting devices. The plurality of light emitting devices include first light emitting devices arranged on an inner side of the vehicle and having a first light emitting area and second light emitting devices arranged on an outer side of the vehicle having a second light emitting area. A first light distribution emitted from first lens units having the first light emitting devices and a second light distribution emitted from second lens units having the second light emitting devices are included, and the second light emitting area is smaller than the first light emitting area as well as a range of the second light distribution is smaller than a range of the first light distribution.

8 Claims, 10 Drawing Sheets

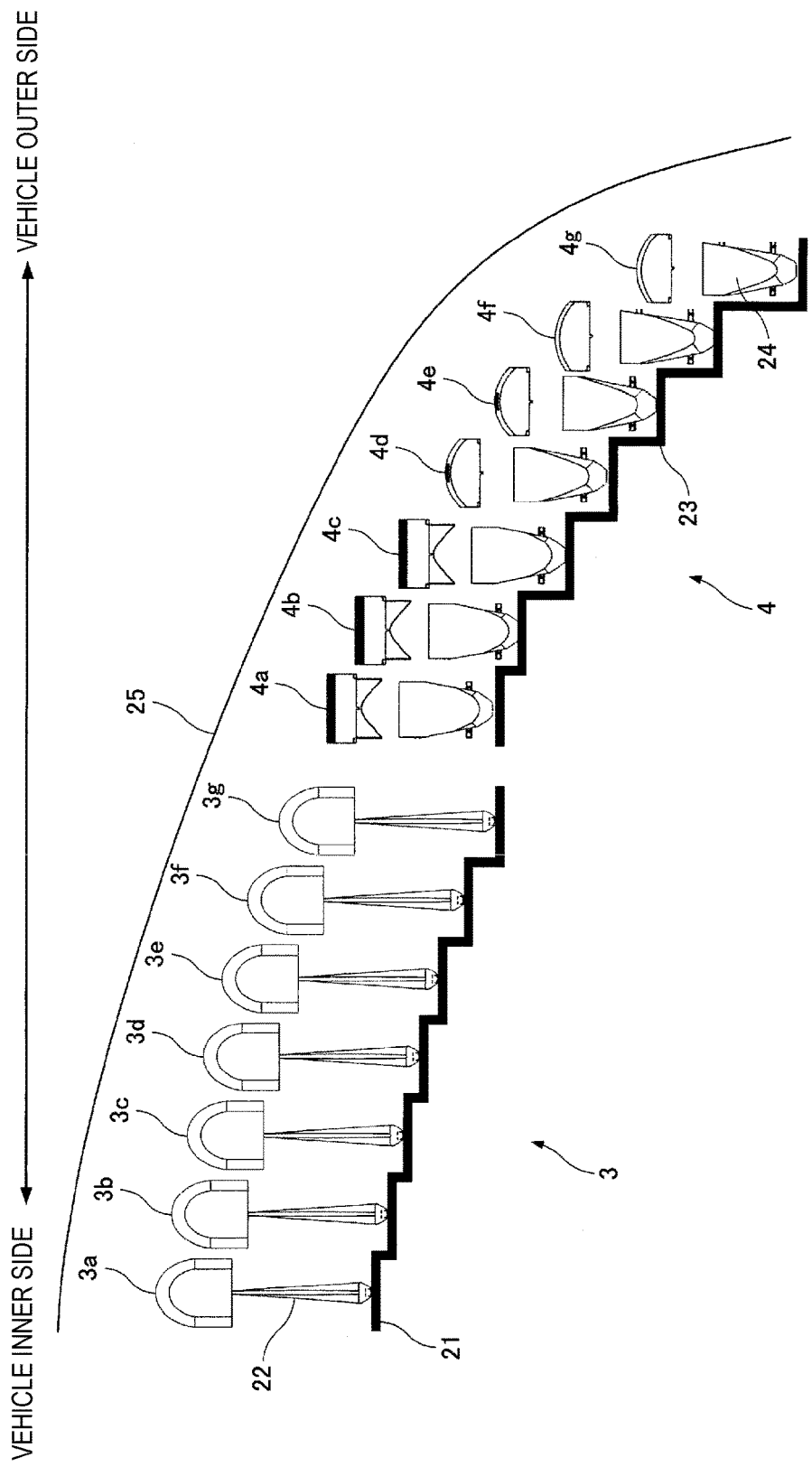

HEADLIGHT FOR VEHICLE AND VEHICLE USING THE SAME

TECHNICAL FIELD

The technical field relates to a headlight for a vehicle and a vehicle using the same.

BACKGROUND

The present disclosure relates to a headlamp as a lighting fixture for a vehicle.

A lighting device using a light emitting diode (LED) has been hitherto known for a headlamp in a vehicle.

FIG. 12 shows a lighting device 100 described in JP-T-2005-537665 (Patent Literature 1).

The lighting device 100 includes a light emitting device 10, a substrate 11, a reflector 12 and an aperture 13. Light emitted from the light emitting device 10 is reflected on the reflector 12 and irradiated to the front through the aperture 13.

The light emitting device 10 is a high-output LED and a point light source. The shape of the reflector 12 is designed with respect to the point light source based on optical design. A high heat value is generated due to the high-output LED. Accordingly, a cooling mechanism is provided in the substrate 11 and a lower part thereof (not shown).

The current lighting device requires an irradiation value with a higher illumination for reasons of safety and the like. However, one light emitting device 10 is provided in the lighting device in Patent Literature 1, and a further higher output is necessary for securing illumination. The high output is accompanied by high heat generation. Accordingly, additional cooling is necessary. Furthermore, it is necessary to increase the size of a portion of the reflector for optical design purposes. Therefore, the lighting device itself is increased in size when one light emitting device 10 is used. However, it is difficult to increase the illumination size for reasons of design shape and air resistance reduction when used for a vehicle.

SUMMARY

An object of the present disclosure is to realize a lighting device which is small in size, capable of obtaining a high-quality light distribution and not requiring a particular heat dissipation structure as a lighting device using an LED as a light emitting device.

A headlight for a vehicle according to the present disclosure includes a plurality of lens units, in which the plurality of lens units have a plurality of light emitting devices, and lenses arranged so as to face the respective plural light emitting devices, the plurality of light emitting devices include first light emitting devices arranged on an inner side of the vehicle and having a first light emitting area and second light emitting devices arranged on an outer side of the vehicle having a second light emitting area, a first light distribution emitted from first lens units having the first light emitting devices and a second light distribution emitted from second lens units having the second light emitting devices are included, and the second light emitting area is smaller than the first light emitting area as well as a range of the second light distribution is smaller than a range of the first light distribution.

A headlight for a vehicle also according to the present disclosure includes a plurality of lens units, in which the plurality of lens units have a plurality of light emitting devices arranged from an inner side of the vehicle to an outer side of the vehicle with step differences, and lenses arranged so as to face the respective plural light emitting devices, light distributions emitted through the light emitting devices on the inner side of the vehicle in the plural light emitting devices and the lenses and light distributions emitted through the light emitting devices on the outer side of the vehicle in the plural light emitting devices and the lenses are included, a light emitting area of light emitting devices on the inner side of the vehicle and a light emitting area of light emitting devices on the outer side of the vehicle are the same or approximately the same, and a range of light distributions emitted through the light emitting devices and lenses on the inner side of the vehicle and a range of light distributions emitted through the light emitting devices on the outer side of the vehicle in the plural light emitting devices and lenses are the same or approximately the same.

A vehicle according to the present disclosure includes the headlight for the vehicle according to any of the above mounted thereon.

According to the above structures, it is possible to realize a lighting device using light emitting devices of LEDs which are small in size, capable of obtaining a high-quality light distribution and not requiring a particular heat dissipation structure. As the light emitting devices having a large light emitting area and a wide light distribution are arranged on the inner side, reflection of light can be reduced and both high efficiency and visibility from pedestrians can be realized. Light distribution characteristics emitted from respective lens units are controlled by changing the light emitting areas of the LEDs, thereby realizing a headlight for a vehicle with high heat dissipation performance.

Moreover, in a case where the first and second light emitting devices are mounted on a single metal substrate, a first distance of a step difference between adjacent light emitting devices in the first light emitting devices and a second distance of a step difference between adjacent light emitting devices in the second light emitting devices are included and the second distance is larger than the first difference. The heat dissipation property of the light emitting devices with the small light emitting area can thus be improved and the reliability of the headlight for the vehicle can also be increased.

Furthermore, in a case where the number of the plural first lens units is smaller than the number of the plural second lens units, formation of light distributions in the headlight can be efficiently realized and the headlight for the vehicle with high heat dissipation can be realized.

In a case where the plurality of light emitting devices from the inner side of the vehicle to the outer side of the vehicle are mounted on a single substrate, and a third distance of a step difference between the plural light emitting devices on the inner side of the vehicle and a fourth distance of a step difference between light emitting devices on the outer side of the vehicle are the same or approximately the same, a headlight for a vehicle with a high heat dissipation property can be realized with respect to the headlight for the vehicle that realizes light distributions of a variable light distribution headlamp (ADB).

In a case where the lenses include a plurality of first lenses arranged so as to face the respective plural light emitting devices and each having an incident port and an emission port, and a plurality of second lenses arranged so as to face respective emission ports of the plural first lenses and each having an incident surface and an emission surface, the degree of freedom in formation of light distributions can be increased.

In a case where the plural first lenses each include the incident port on which light from the light emitting device is incident, a first incident surface having a lens shape for condensing light from the light emitting device on a surface facing the light emitting device, a second incident surface guiding light not passing through the first incident surface to a side surface direction of the first lens, a first reflective surface totally reflecting light passing through the second incident surface and guiding the light to the emission port, and a second reflective surface totally reflecting light deviated from a direction of the emission port after passing through the first incident surface and light deviated from the direction of the emission port after being reflected on the first reflective surface to guide the light to the emission port, a headlight with high efficiency can be realized.

BRIEF DESCRIPTION OF THE DRAWINGS

FIG. 2 is a side view of a headlight on the right side according to the embodiment.

DESCRIPTION OF EMBODIMENT

Hereinafter, a headlight for a vehicle and a vehicle using the same according to the present disclosure will be explained with reference to drawings showing an embodiment.

Vehicle 1

Figure 1:
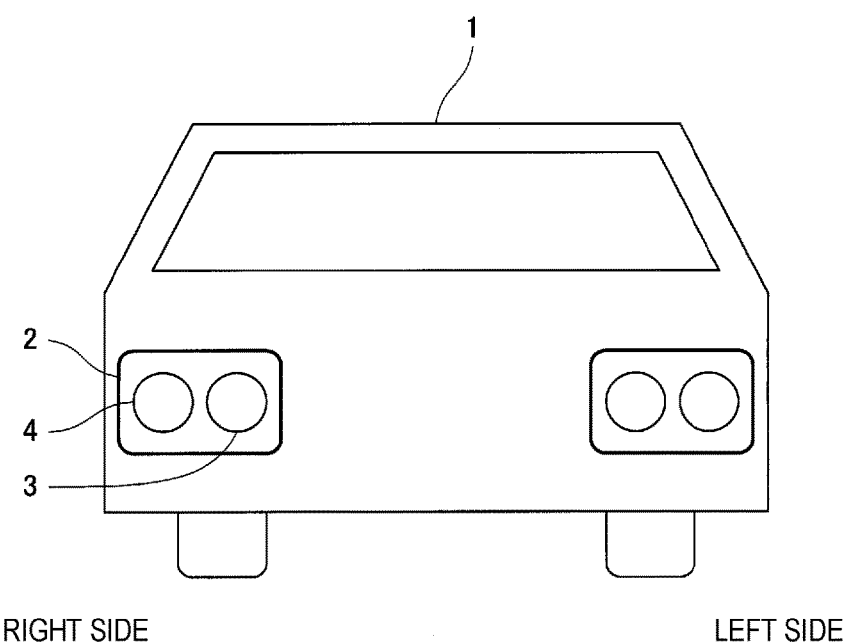
FIG. 1 is a view of a vehicle according to an embodiment of the present disclosure seen from the front.

FIG. 1 is a view showing a vehicle 1 seen from the front. Two headlights 2 as headlights for the vehicle are attached on right and left of the vehicle 1 in a front face of the vehicle 1 so as to be in right and left symmetrical positions lower than a viewpoint of a driver.

Each of the headlights 2 is formed by a high beam 3 as a driving headlight and a low beam 4 as a passing headlight. In a variable light distribution headlamp (Adaptive Driving Beam: ADB), lighting of the high beam 3 is controlled in a state where the low beam 4 is lighted, and light is controlled so as not to dazzle a preceding vehicle or an oncoming vehicle. Here, a headlight on the right side is defined as the headlight 2 positioned on the right side as seen from the driver, and a head light on the left side is defined as the headlight 2 positioned on the left side as seen from the driver.

Headlight 2

FIG. 2 is a side view of the headlight 2 on the right side. The headlight 2 is formed by the high beam 3, the low beam 4 and an outer lens 25. The high beam 3 includes a high beam substrate 21 and plural lens units 3a to 3g arranged on the high beam substrate 21. The low beam 4 includes a low beam substrate 23 and plural lens units 4a to 4g arranged on the low beam substrate 23.

In the high beam substrate 21, plural steps are formed between an end on an inner side of the vehicle and an end on an outer side of the vehicle, and the end on the outer side of the vehicle is positioned rearward of the end on the inner side of the vehicle. Also, in the low beam substrate 23, plural steps are formed between an end on the inner side of the vehicle and an end on the outer side of the vehicle, and the end on the outer side of the vehicle is positioned rearward of the end on the inner side of the vehicle in the same manner as the high beam substrate 21.

Low Beam 4

Figure 4A:
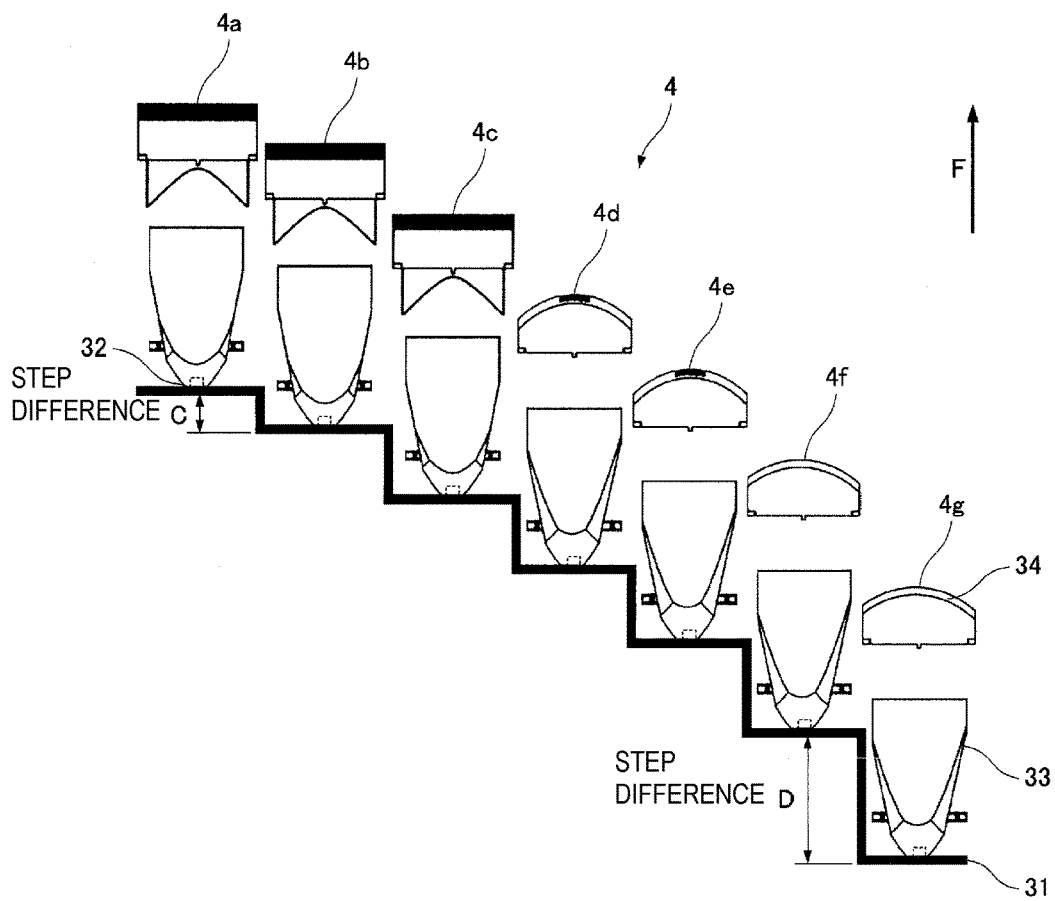
FIG. 4A is a side view of a low beam according to the embodiment.

FIG. 4A is a side view of the low beam 4 according to the embodiment. The low beam 4 is a low beam on the right side installed in the vehicle. The low beam 4 has plural lens units 4a to 4g.

The low beam 4 includes a single metal substrate 31 as the low beam substrate 23 on which LEDs 32 as light emitting devices are mounted and a plurality of first lenses 33 respectively arranged over the LEDs 32 and a plurality of second lenses 34 positioned above the first lenses 33 in a light emitting direction of the light. Respective first lenses 33 are arranged so as to respective LEDs 32, and respective second lenses 34 are arranged at positions corresponding to upper parts of the first lenses 33.

The first lenses 33 are manufactured by resin molding using transparent resin such as acrylic resin and polycarbonate resin. The second lenses 34 are also manufactured by resin molding using transparent resin such as acrylic resin and polycarbonate resin.

Figure 4B:
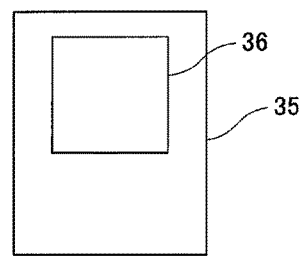
FIG. 4B is a view showing a light emitting area of a light emitting device of the low beam on an inner side of the vehicle and FIG. 4C is a light emitting area of a light emitting device of the low beam on an outer side of the vehicle.

FIG. 4B is a schematic view of the light emitting device provided in the lens units 4a to 4c in the light emitting devices of the lens units 4a to 4g. The light emitting device has an LED package 35 and a light emitting portion 36 emitting light in the LED package 35.

Figure 4C:
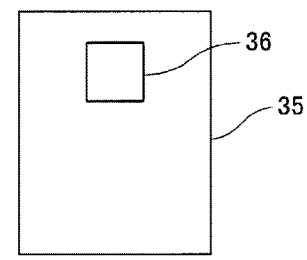

FIG. 4C is a schematic view of the light emitting device provided in the lens units 4d to 4g. The light emitting device has an LED package 35 and a light emitting portion 36 emitting light in the LED package 35. The light emitting portion 36 is mainly formed of a phosphor, which is formed of a YAG (yttrium, aluminum, garnet) phosphor material which absorbs light emitted from a blue LED and emits yellow light.

As described above, a light emitting area of the light emitting portion 36 (a second light emitting portion) of the light emitting device (a second light emitting device) used for the lens units 4d to 4g (second lens units) is smaller than a light emitting area of the light emitting portion 36 (a first light emitting portion) of the light emitting device (a first light emitting device) used for the lens units 4a to 4c (first lens units).

As the low beam 4 is arranged on the outer side of the vehicle with respect to the high beam 3, an angle of inclination as an angle made by a ridgeline on a back surface of the outer lens 25 and a travelling direction of the vehicle is increased as going to the outer side of the vehicle. Therefore, the lens units are arranged along the outer lens 25 so that a step difference in the metal substrate 31 is increased as going to the outer side of the vehicle.

That is, when a step difference between a light emitting surface of the LED 32 (the first light emitting device) of the lens unit 4a and a light emitting surface of the LED 32 of the lens unit 4b adjacent to the lens unit 4a is a step difference C (a first distance), and a step difference between a light emitting surface of the LED 32 (the second light emitting device) of the lens unit 4g and a light emitting surface of the LED 32 of the lens unit 4f adjacent to the lens unit 4g is a step difference D (a second distance) as shown in FIG. 4A, the step difference D is higher than the step difference C. According to the structure, the heat dissipation property of the light emitting device having the light emitting portion 36 with the small area is improved and reliability of the headlight for the vehicle can be increased.

Figure 5:
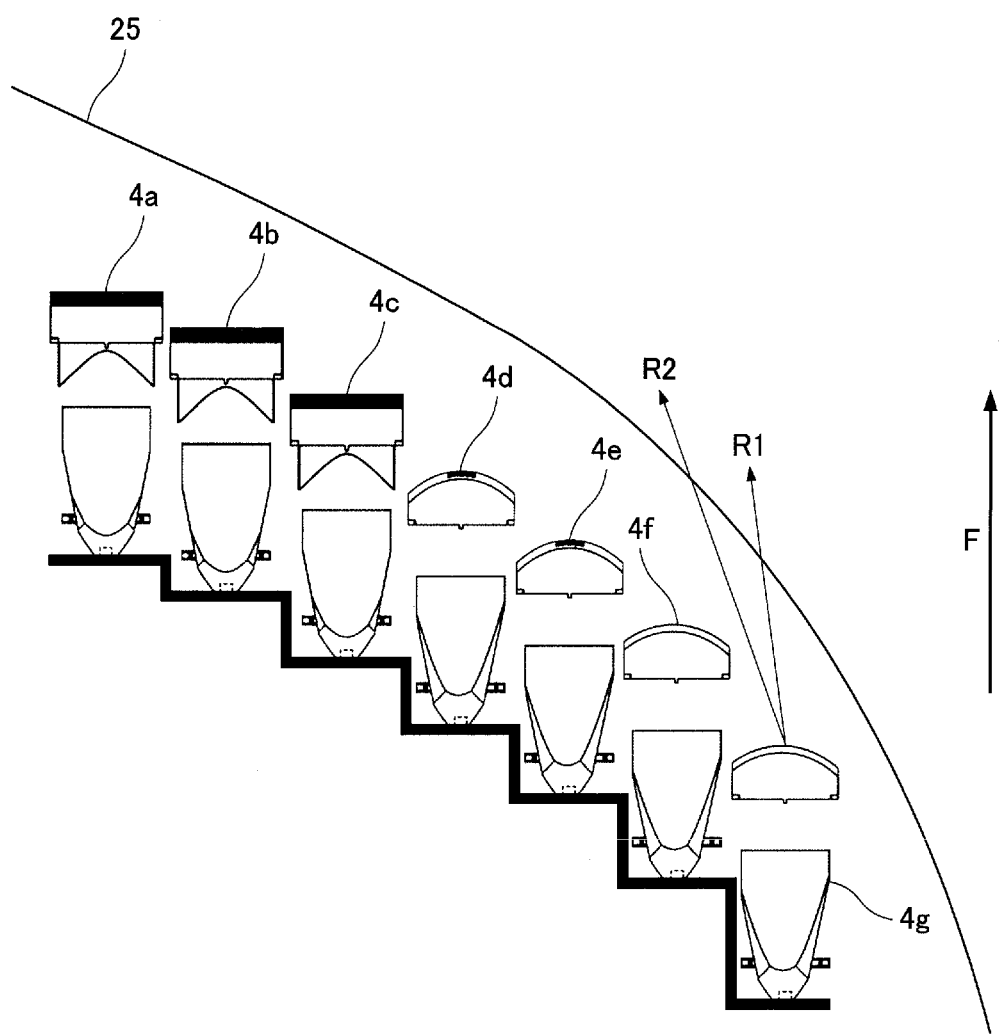
FIG. 5 is a view showing two kinds of light rays emitted from a lens unit on the outer side of the vehicle according to the embodiment.

Two kinds of light rays R1 and R2 emitted from the lens unit 4g are shown in FIG. 5. Here, when the light ray R1 is compared with the light ray R2, an angle made by the light ray R2 and the travelling direction is larger than an angle made by the light ray R1 and the travelling direction. When incident angles of the light rays R1 and R2 with respect to the outer lens 25 are compared, the incident angle of the light ray R1 is smaller than that of the light ray R2. That is, Fresnel reflection in the outer lens 25 is reduced as the incident angle of the light ray R1 is smaller. Therefore, a lens unit with a wide light distribution is used at a part where the step difference is low and a lens unit with a narrow light distribution is used at a part where the step difference is high, thereby suppressing reflection of light (Fresnel reflection) in the outer lens 25.

That is, when a distribution of light emitted from the lens units 4a to 4c as the first lens units is a first light distribution and a distribution of light emitted from the lens units 4d to 4g as the second lens units is a second light distribution, the area (second light emitting area) of the light emitting portion 36 used for the lens units 4d to 4g is set to be smaller than the area (first light emitting area) of the light emitting portion 36 used for the lens units 4a to 4c as well as the first light distribution is set to be wider than the second light distribution.

According to the above, the light emitting portion with a larger light emitting area and a wider light distribution is arranged on the inner side, thereby reducing reflection of light and realizing both high efficiency and visibility for pedestrians.

The number of the first lens units forming the first light distribution is smaller than the number of the second lens units forming the second light distribution. Here, the number of the first lens units is three (4a to 4c), and the number of the second lens units is four (4d to 4g). When the light distribution is wider, peak luminous intensity is reduced, therefore, it is necessary increase luminous intensity by reducing the number of lens units with a wider light distribution. Accordingly, formation of light distribution of the headlight can be efficiently realized and the headlight for the vehicle with high heat dissipation can be realized.

High Beam 3

Figure 3A:
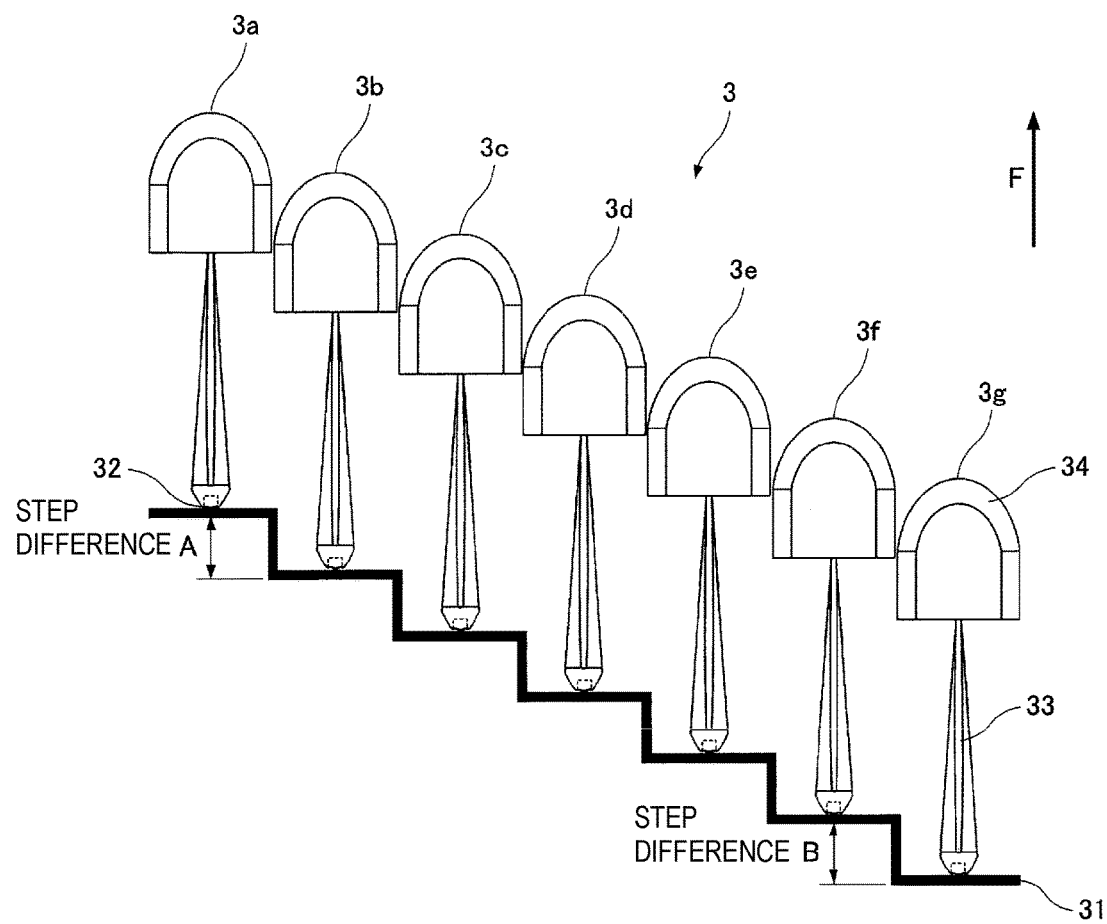
FIG. 3A is a side view of a high beam according to the embodiment.

FIG. 3A is a side view of the high beam 3. The high beam 3 is a high beam on the right side arranged on the vehicle when the travelling direction of the vehicle is set to a direction of an arrow F as well as when the vehicle is seen from above. Each high beam 3 has a plurality of lens units 3a to 3g.

The high beam 3 includes a signal metal substrate 31 as the high beam substrate 21 on which LEDs 32 as light emitting devices are mounted, a plurality of first lenses 33 respectively arranged over the LEDs 32 and a plurality of second lenses 34 positioned above the first lenses 33 in a light emitting direction of the light.

The first lenses 33 are arranged so as to correspond to the plural LEDs 32, having the plural second lenses 34 arranged at positions corresponding to upper parts of the first lenses 33. The first lenses 33 are manufactured by resin molding using transparent resin such as acrylic resin and polycarbonate resin. The second lenses 34 are arranged above the first lenses 33 so as to correspond to respective first lenses 33. The second lenses 34 are also manufactured by resin molding using transparent resin such as acrylic resin and polycarbonate resin. FIG. 3C shows a perspective view of the second lens 34 and a periphery thereof.

Figure 3B:
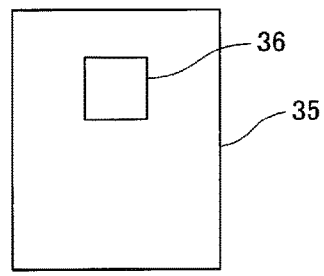
FIG. 3B is a view showing a light emitting area of a light emitting device of the high beam and FIG. 3C is a perspective view of a lens unit showing a shape of a second lens of the high beam.
Figure 3C:
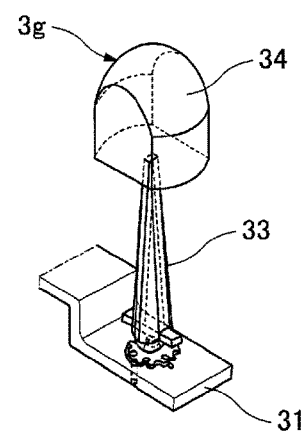

FIG. 3B is a schematic view of a light emitting device provided in the lens units 3a to 3g. The light emitting device has an LED package 35 and a light emitting portion 36 emitting light in the LED package 35. The light emitting portion 36 is mainly formed of a phosphor, which is formed of the YAG (yttrium, aluminum, garnet) phosphor material which absorbs light emitted from the blue LED and emits yellow light. Here, respective light emitting portions 36 of the lens units 3a to 3g have light emitting portions with the same area.

The high beam 3 is arranged on the inner side of the vehicle with respect to the low beam 4. Therefore, when an angle made by a ridgeline on a back surface of the outer lens 25 and the travelling direction of the vehicle is defined as an angle of inclination, the angle of inclination is reduced. Therefore, the step difference between light emitting surfaces of adjacent LEDs in the metal substrate 31 are minor, and the step differences are the same or approximately the same. The distance between the light emitting devices 32 do not change very much. That is, when a step difference A is compared with a step difference B, the step difference A and the step difference B do not differ very much.

That is, when a step difference between the LED 32 of the lens unit 3a and the LED 32 of the lens unit 3b is a step difference A (third distance), and a step difference between the LED 32 of the lens unit 3g and the LED 32 of the lens unit 3f is a step difference B (fourth distance), the step difference A and the step difference B are the same or approximately the same. According to the above structure, step differences are the approximately the same, therefore, heat can be efficiently dissipated and reliability of the headlight for the vehicle can be increased.

Structure of Lens Unit

Next, a structure of one lens unit 30 will be explained with reference to FIG. 6, FIG. 7 and FIG. 8.

The lens unit 30 includes a first lens 33 and a second lens 34. The first lens 33 is a long shape elongated in a front and rear direction. An emission port 46 is provided in a front end of the first lens 33 and an incident port 41 is provided in a rear end. The incident port 41 is provided with a concave portion surrounding the LED 32. As shown in FIG. 7, a first incident surface 42 is provided on a bottom surface of the concave portion. A second incident surface 43 is provided on a side surface of the concave portion. The first incident surface 42 has a convex shape toward the LED 32.

A side surface of the first lens 33 has a two-stage structure including a first reflective surface 44 on a rear side and a second reflective surface 45 on a front side. The first reflective surface 44 has a tapered shape in which a width is reduced toward the rear and the second reflective surface 45 is a tapered shape in which a width is reduced toward the front. The emission port 46 of the first lens 33 has a rectangular shape. The first lens 33 is manufactured by a common resin molding method using transparent resin such as acrylic resin and polycarbonate resin.

According to the structures of the first and second lenses, the degree of freedom in formation of light distribution can be increased and a headlight with high efficiency can be realized.

Light generated and scattered from the LED 32 is first incident on the first incident surface 42 provided on the bottom surface of the concave portion or the second incident surface 43 provided on the side surface of the concave portion. For example, a light path L1 passing the center of the first incident surface 42 travels straight and reaches the emission port 46 of the first lens 33. A light path L2 passing a place slightly shifted from the center of the first incident surface 42 is refracted toward the center by the convex-shaped first incident surface 42, then, travels straight and reaches the emission port 46. A light path L3 passing a place shifted to some degree from the center of the first incident surface 42 is refracted on the convex-shaped first incident surface 42, then, totally reflected by the second reflective surface 45 and reaches the emission port 46. A light path L4 passing the second incident surface 43 is refracted on the second incident surface 43, then, totally reflected on the first reflective surface 44 and further totally reflected on the second reflective surface 45 to reach the emission port 46.

As described above, light generated from the LED 32 converges to the emission port 46 of the first lens 33. That is, the first lens 33 guides the light generated from the LED 32 to the second lens 34 by using the emission port 46 as a secondary light source.

Figure 6:
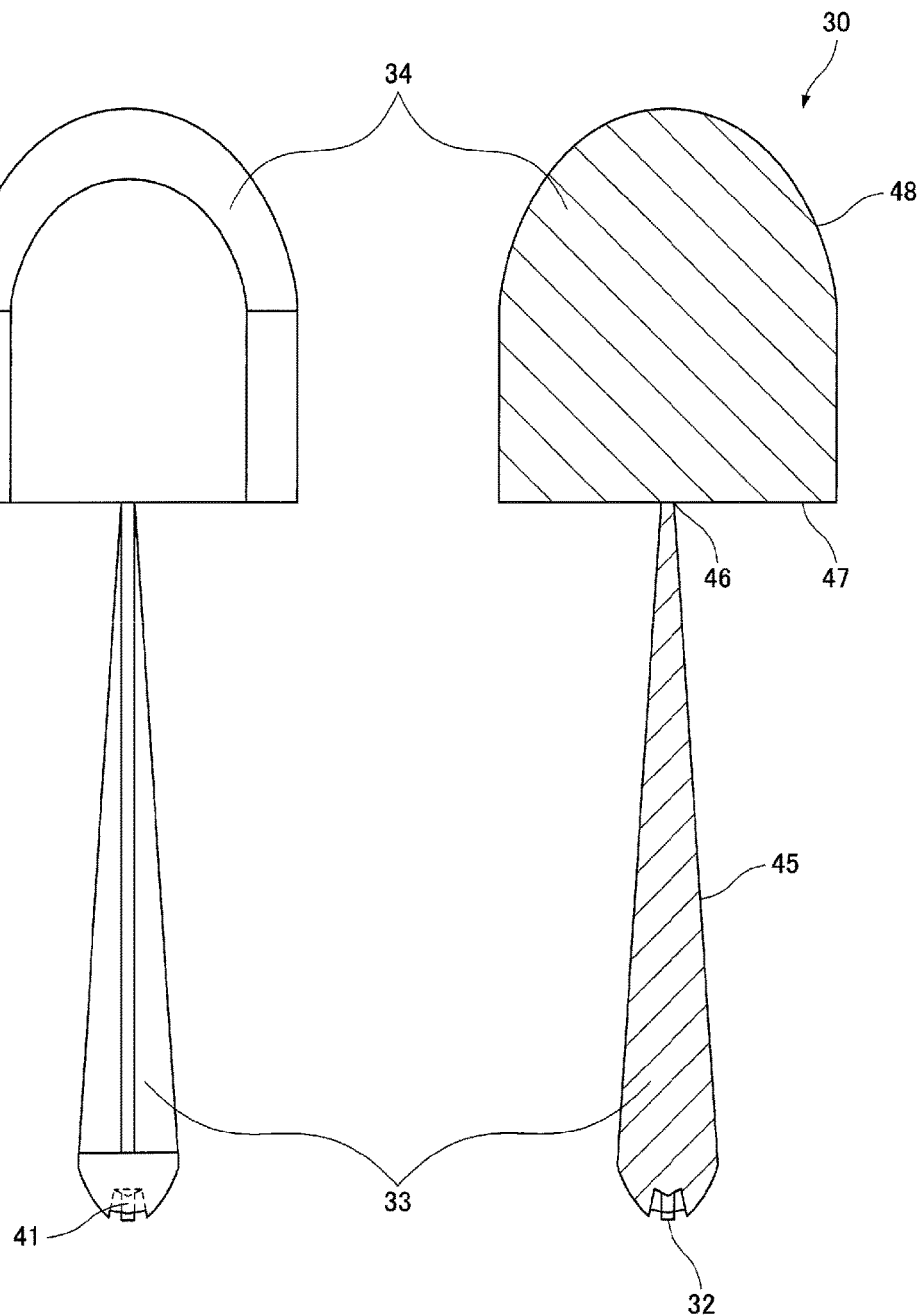
FIG. 6 shows (a) a side view and (b) a cross-sectional view of one lens unit according to the embodiment.
Figure 7:
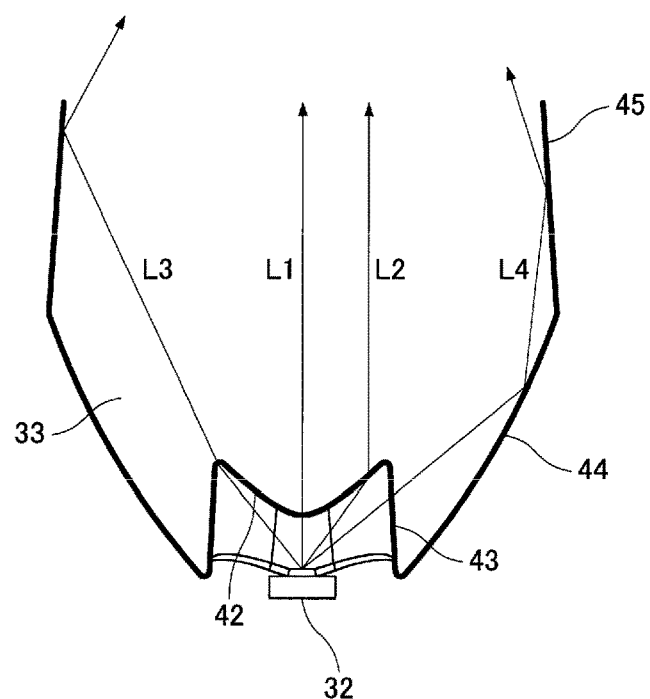
FIG. 7 is an enlarged cross-sectional view of an incident port of a first lens in one lens unit according to the embodiment.

The second lens 34 includes an incident surface 47 and an emission surface 48 as shown in (a) of FIG. 6. The incident surface 47 of the second lens 34 has a planar shape and faces the emission port 46 of the first lens 33 with a gap interposed therebetween. The emission surface 48 of the second lens 34 has the convex shape toward the vehicle front. The second lens 34 is also manufactured by a common resin molding method using transparent material such as acrylic resin and polycarbonate resin.

Figure 8:
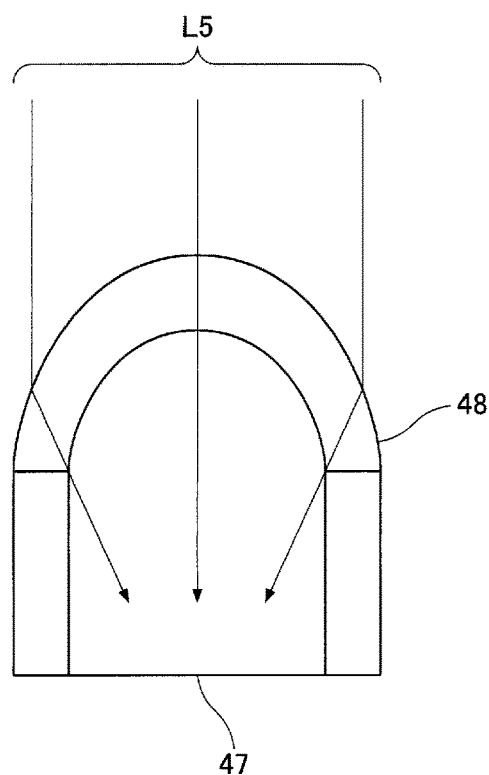
FIG. 8 is an explanatory view for light rays, incident in parallel from an emission surface's side of a second lens.

As shown in FIG. 8, the second lens 34 condenses light rays L5 incident in parallel from the emission surface 48 side so as to converge to one point.

A light condensing position differs depending on the lens units but may be positioned on the incident surface 47 of the second lens 34 or in the vicinity of the emission port 46 of the first lens.

A plurality of lens units 30 are aligned and shown in FIG. 2 as the high beams 3 or the low beams 4.

Figure 9:
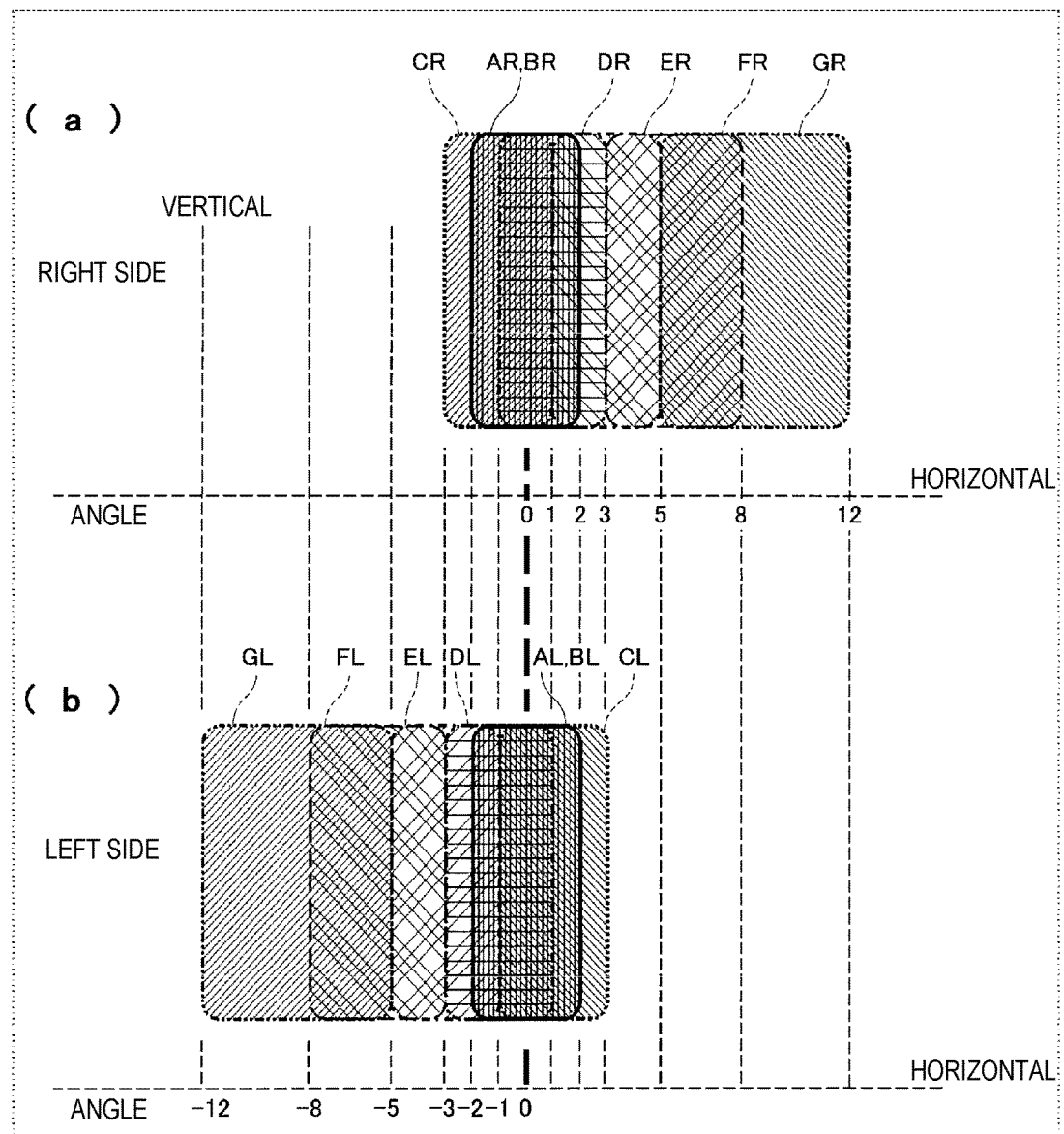
FIG. 9 shows (a) a schematic view of irradiation ranges in a state where the entire high beam on the right side according to the embodiment is lighted and (b) a schematic view of irradiation ranges in a state where the entire high beam arranged in a right and left symmetrical position of the high beam according to the embodiment is lighted.

Light Distribution Characteristics at the Time of Lighting High Beam (a) of FIG. 9 shows irradiation ranges of light in a state where all the LED 32 in the lens units 3a to 3g in the high beam 3 are lighted. Signs AR to GR in the drawing denote lights from respective lens units 3a to 3g. However, there is no relationship between alignment (positions) of the lens units and irradiation positions of light, and the irradiation position is set according to each lens unit. The irradiation positions are designed so that the lens units 3a and 3b performs irradiation at 0±2°, the lens unit 3c performs irradiation at −1±2°, the lens unit 3d performs irradiation at 1±2°, the lens unit 3e performs irradiation at 3±2°, the lens unit 3f performs irradiation at 5±3° and the lens unit 3e performs irradiation at 8±4°, mainly.

(b) of FIG. 9 shows irradiation ranges in a state where all the LED 32 in lens units of a high beam on the left side are lighted, which are arranged in right and left symmetrical positions of the high beam 3 on the right side with respect to the center of the vehicle 1. In (b) of FIG. 9, AL to GL denote irradiation ranges of lights from a headlight in which the lens units 3a to 3b are arranged in right and left symmetrical positions, AL to GL are ranges obtained by inverting AR to GR respectively in right and left symmetrical positions with respect to horizontal 0 (zero) degrees ad an axis. It is found from (a) of FIG. 9 and (b) of FIG. 9 that the irradiation ranges of light on the right side and the left side are right and left symmetrical with respect to a light distribution angle of 0 degrees.

Figure 10:
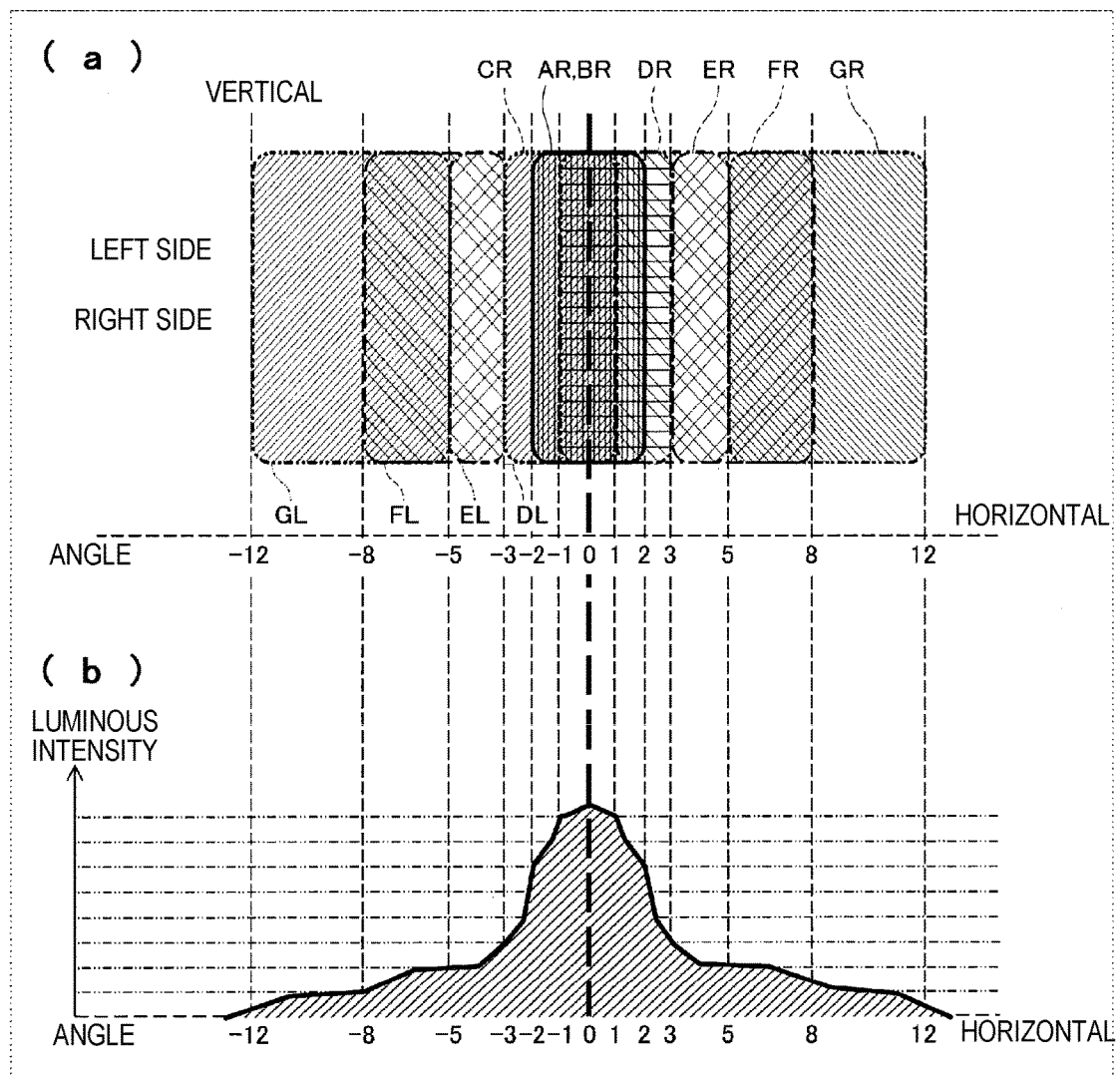
FIG. 10 shows (a) a schematic view of irradiation ranges in a state where the entire right-and-left high beams according to the embodiment are lighted and (b) is a cross-sectional view of light distribution characteristics in a state where the entire right-and-left high beams shown in (a) of FIG. 10 are lighted.

(a) of FIG. 10 shows a light distribution of combine light of the headlights of high beams on the right side and the left side. (b) of FIG. 10 shows a light intensity distribution corresponding to (a) of FIG. 10.

In the high beam, light can be cut in places not required to be irradiated by turning on/off the LEDs 32 arranged under the respective lens units 3a to 3g.

Light Distribution Characteristics at the Time of Lighting Low Beam

Figure 11:
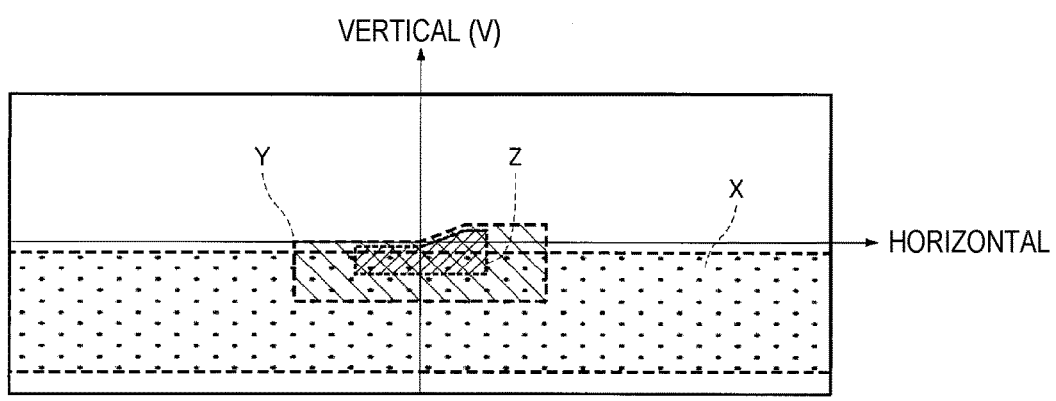
FIG. 11 is a schematic view of irradiation ranges of light in a state where the entire low beam on the right side according to the embodiment is lighted.
Figure 12:
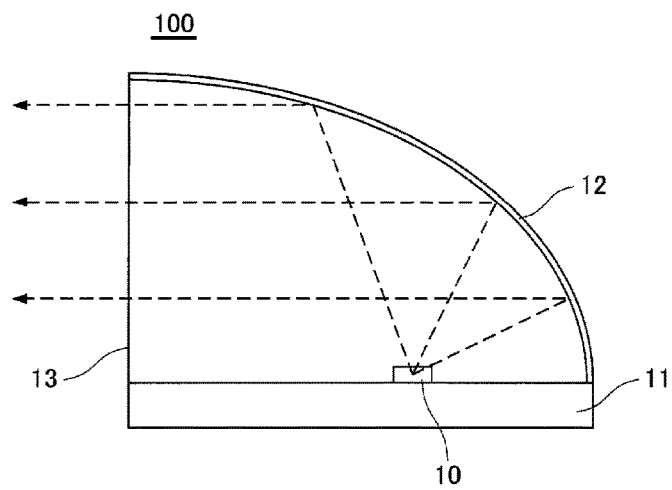
FIG. 12 is a cross-sectional view of a related-art lighting device.

FIG. 11 shows irradiation ranges of lights in a state where all the LEDs 32 in the lens units 4a to 4g of the low beam 4 are lighted. Signs X to Z in the drawing denotes lights from respective lens units 4a to 4g. A light distribution at the time of all LEDs are lighted is formed by three ranges. Alight distribution X is the widest light distribution and formed by lights from the lens units 4a to 4c, a light distribution Y is alight distribution of an intermediate range and formed by lights from the lens units 4d and 4e, and a light distribution Z is a light distribution of the narrowest range and formed by lights from the lens units 4f and 4g. FIG. 11 shows the light distribution of the headlight of the low beam on the right side, and the low beam has light distributions having the same shape on the right and left lenses, therefore, explanation is omitted here.

Here, the number of the first lens units 4a to 4c having the wide light distribution is three, the number of the second lens units 4d to 4g having the narrower light distribution is four, therefore, the number of the lens units having the wide distribution is small. In the low beam, a high peak luminous intensity and a wide range in right and left are requested. In order to realize a light distribution extending in a horizontal direction while increasing the peak luminous intensity, it is preferable to increase the number of the lens units having the narrow light distribution to be larger than the number of the lens units having the wide light distribution.

Though the light emitting areas of the high beam are set to the same, they may be different. The first lens is configured to be reduced in size as coming close to the emission port 46 from the LED, however, the present disclosure is not limited to this, and can be increased in size. Though the shape of the emission port 46 in the first lens has not been particularly mentioned, a rectangular shape, an elliptical shape or shapes in which part is cut from a semicircle or semi-elliptical shape may be adopted, and illumination distributions with free shapes can be formed by combinations these shapes.

The headlight for the vehicle according to the present disclosure can be used not only lighting devices for cars also for lighting devices for vehicles in a wide range of variations. The headlight may also be used for lighting devices for buildings.

What is claimed is:

1. A headlight for a vehicle comprising:
    a plurality of lens units, wherein the plurality of lens units include:
        a plurality of light emitting devices; and
        lenses arranged to face the plurality of light emitting devices, respectively, wherein the plurality of light emitting devices include:
            first light emitting devices arranged on an inner side of the vehicle and having a first light emitting area; and
            second light emitting devices arranged on an outer side of the vehicle and having a second light emitting area,
        wherein a plurality of first lens units having the first light emitting devices emit a first light distribution,
        wherein a plurality of second lens units having the second light emitting devices emit a second light distribution,
        wherein the second light emitting area is smaller than the first light emitting area, and
        wherein a range of the second light distribution is smaller than a range of the first light distribution.

2. The headlight for the vehicle according to claim 1,
    wherein the first and second light emitting devices are mounted on a single metal substrate,
    wherein the first light emitting devices include a first distance of a step difference between adjacent light emitting devices
    wherein the second light emitting devices include a second distance of a step difference between adjacent light emitting devices, and
    wherein the second distance is larger than the first difference.

3. The headlight for the vehicle according to claim 2, wherein the number of the plurality of first lens units is smaller than the number of the plurality of second lens units.

4. A vehicle on which the headlight for the vehicle according to claim 3 is mounted.

5. The headlight for the vehicle according to claim 2,
    wherein the lenses include a plurality of first lenses arranged to face the respective plurality of light emitting devices and each having an incident port and an emission port, and
    a plurality of second lenses arranged so as to face respective emission ports of the plurality of first lenses and each having an incident surface and an emission surface.

6. The headlight for the vehicle according to claim 5, wherein the plurality of first lenses each include
    the incident port on which light from the light emitting device is incident,
    a first incident surface having a lens shape for condensing light from the light emitting device on a surface facing the light emitting device,
    a second incident surface guiding light not passing through the first incident surface to a side surface direction of the first lens,
    a first reflective surface totally reflecting light passing through the second incident surface and guiding the light to the emission port, and
    a second reflective surface totally reflecting light deviated from a direction of the emission port after passing through the first incident surface and light deviated from the direction of the emission port after being reflected on the first reflective surface to guide the light to the emission port.

7. A headlight for a vehicle according to claim 1, wherein the light emitting devices include an LED package.

8. A headlight for a vehicle according to claim 1, wherein the light emitting devices include a light emitting portion which absorbs blue light and emits yellow light.

* * * * *